(12) United States Patent
Gaither et al.

(10) Patent No.: US 7,765,363 B2
(45) Date of Patent: Jul. 27, 2010

(54) MASK USABLE FOR SNOOP REQUESTS

(75) Inventors: Blaine D. Gaither, Fort Collins, CO (US); Benjamin D. Osecky, Fort Collins, CO (US); Gerald J. Kaufman, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 11/828,811

(22) Filed: Jul. 26, 2007

(65) Prior Publication Data

US 2009/0031087 A1    Jan. 29, 2009

(51) Int. Cl.
*G06F 12/08* (2006.01)
(52) U.S. Cl. .................................. 711/146; 711/E12.04
(58) Field of Classification Search ........................ None
See application file for complete search history.

(56) References Cited

U.S. PATENT DOCUMENTS

| 6,073,212 | A | 6/2000 | Hayes et al. |
| 6,304,945 | B1 | 10/2001 | Koenen |
| 2004/0039880 | A1 | 2/2004 | Pentkovski et al. |
| 2006/0224837 | A1 | 10/2006 | Blumrich et al. |
| 2006/0230239 | A1 | 10/2006 | Blumrich et al. |
| 2006/0294319 | A1 | 12/2006 | Mansell |

*Primary Examiner*—Kevin Verbrugge

(57) ABSTRACT

A system comprises a plurality of cache agents, a computing entity coupled to the cache agents, and a programmable mask accessible to the computing entity. The programmable mask is indicative of, for at least one memory address, those cache agents that can receive a snoop request associated with a memory address. Based on the mask, the computing entity transmits snoop requests, associated with the memory address, to only those cache agents identified by the mask as cache agents that can receive a snoop request associated with the memory address.

14 Claims, 2 Drawing Sheets

MASK USABLE FOR SNOOP REQUESTS

BACKGROUND

Many computer systems comprise multiple entities (e.g., processors, input/output devices, etc.) capable of sending data and commands back and forth through the system. Each such transmission uses a portion of the system's available bandwidth. All else being equal, scaling a system to increase the number of entities increases the burden on the bandwidth of the system's communication infrastructure.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
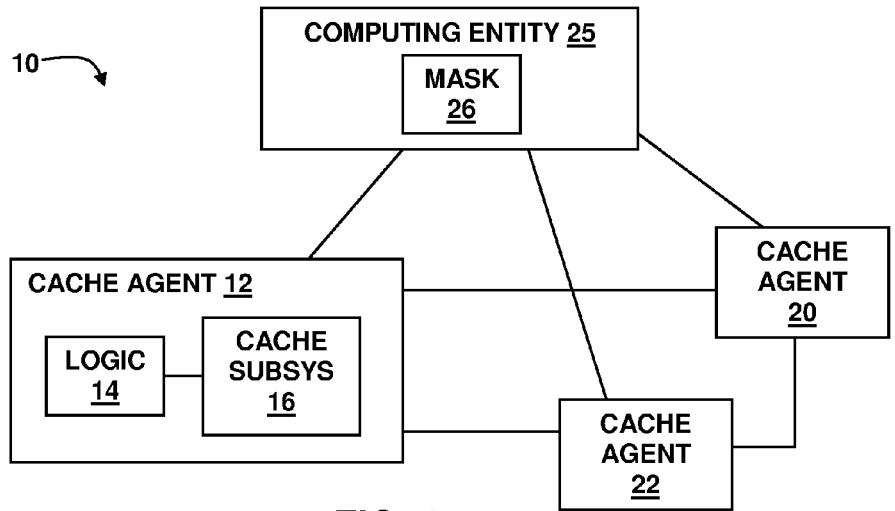
FIG. 1 shows a system in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

By way of definition, the term "cache agent" is used in this disclosure to refer to any logic that comprises cache memory. Examples of a cache agent comprise a processor with a cache subsystem, an input/output device with a cache subsystem, etc.

DETAILED DESCRIPTION

Some computer systems implement cache memory. In some such systems, multiple entities (e.g., processors) each incorporate, or otherwise have access to, their own cache memory. As a result, a particular data item may be present in the cache memory of more than one such entity. Coherency techniques have been employed to ensure the coherency of the data in a cache-based memory system. One type of coherency technique involves the broadcast of "snoop" request from one entity to the other entities in the system to determine the location of a target data item and to ensure the coherency of the data. Snoop requests and associated responses use bandwidth in the system that would otherwise be usable for other types of messages.

In accordance with various embodiments, logic programs a "mask" to indicate which of potentially multiple "cache agents" in the system are able to access certain memory addresses and which cache agents are not able to access such memory addresses. If a particular cache agent is programmatically unable to access a particular memory location, then such cache agent's cache memory will not have the data associated with that particular memory address. That being the case, there is no reason to transmit a snoop request to that particular cache agent. The mask is usable to determine which cache agents do not have access to certain memory locations as a mechanism to reduce the number of snoop requests, and concomitant replies, in the system. The bandwidth that would otherwise have been used for such snoop requests and replies can thus be used for other types of messages (i.e., data, commands, etc.) as desired.

The logic noted above that programs the mask, programs the mask based on a determination as to which cache agents are permitted to access certain memory locations. For example, a system executing a hypervisor may spawn multiple "virtual machines," each virtual machine having one or more cache agents. In this context, a virtual machine is a guest operating system that itself is capable of executing applications. The cache agents of a first virtual machine may not be able to access the memory of a second virtual machine. Thus, a cache agent in the second virtual machine need not snoop the caches of the cache agents of the first virtual machine. Accordingly, a mask used in the second virtual machine is programmed to preclude/avoid a second virtual machine cache agent from transmitting a snoop request to a cache agent in the first virtual machine.

By way of a second example, an operating system may spawn multiple processes running under the operating system. In this context, a "process" is a computing context that comprises its own program counter and state that are distinct from other processes. A cache agent usable to execute one process might not have access to another process' memory and thus snoop requests between processes can be precluded by use of masks.

FIG. 1 illustrates a system 10 in accordance with various embodiments. As shown, system 10 comprises a plurality of cache agents 12, 20, 22. Although three cache agents are shown in the example of FIG. 1, in various embodiments, any number (one or more) of cache agents can be provided in the system. Each cache agent comprises logic 14 coupled to a cache subsystem 16. Logic 14 comprises a processor in some embodiments. Cache subsystem 16 comprises cache memory, a cache controller, tag memory, and other components to implement a cache capability.

The system 10 also comprises a computing entity 25 which may be the same as, or similar to, the cache agents 12, 20, 22. In some embodiments, the computing entity 25 comprises a computer or a processor within a computer.

In the example of FIG. 1, when computing entity 25 has a need, for example, as a result of executing code, to access a particular (target) memory location, the computing entity 25 accesses the mask 26 contained within, or otherwise accessible to, the computing entity 25. Based on the mask, the computing entity 25 transmits snoop requests, associated with the target memory address, to only those cache agents that can receive a snoop request for the target address. The computing entity 25 avoids sending all other cache agents a snoop request for the target address.

Figure 2:
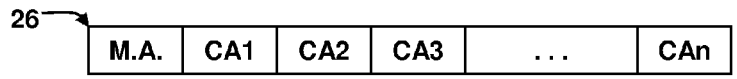
FIG. 2 shows an illustrative embodiment of a mask.

FIG. 2 illustrates an embodiment of the mask 26. The mask comprises a plurality of bits. One or more of the bits encode a particular memory address (MA). For that particular memory address, other bits in the mask are associated with the various cache agents. In an embodiment, each cache agent is assigned one bit in the mask, although multiple mask bits can be used for each cache agent. Further, in some embodiments, more than one cache agent shares a bit of the mask, that is, one or more bits in the mask may be associated with more than one cache agent. For example, a plurality of cache agents may be assigned to a bit in the mask. If a mask bit is set ("1"), that cache agent can be sent a snoop request for the memory address. If the bit is not set ("0"), the cache agent cannot be sent the snoop request. In other embodiments, a logic 0 for a mask bit indicates that the cache agent should be sent the snoop request, and a logic 1 indicates that the cache agent should not be sent the snoop request. In various embodiments, the mask 26 comprises a plurality of sets of bits, each set associated with a different memory address or range of memory addresses. For each such set of bits in the mask 26, the various cache agents that can receive corresponding snoop requests are encoded. As such, for each memory address or range of addresses, the mask 26 can specify which cache agents should and should not be sent snoop requests.

In various embodiments, each of the cache agents 12, 20, 22 can access the mask 26 of the computing entity 25 and transmit snoop requests to select other cache agents based on the mask as described above. In some embodiments, the computing entity 25 transmits a copy of the mask 26 to each cache agent 12, 20, 22 or at least to a cache agent that requests the mask.

The computing entity 25 programs the mask 26 based on information about the operation of the system 10. If certain, for example, processes only use certain cache agents, but not all cache agents, for certain regions of memory, then such information about such processes is used by the computing entity 25 to program the mask 26.

Figure 3:
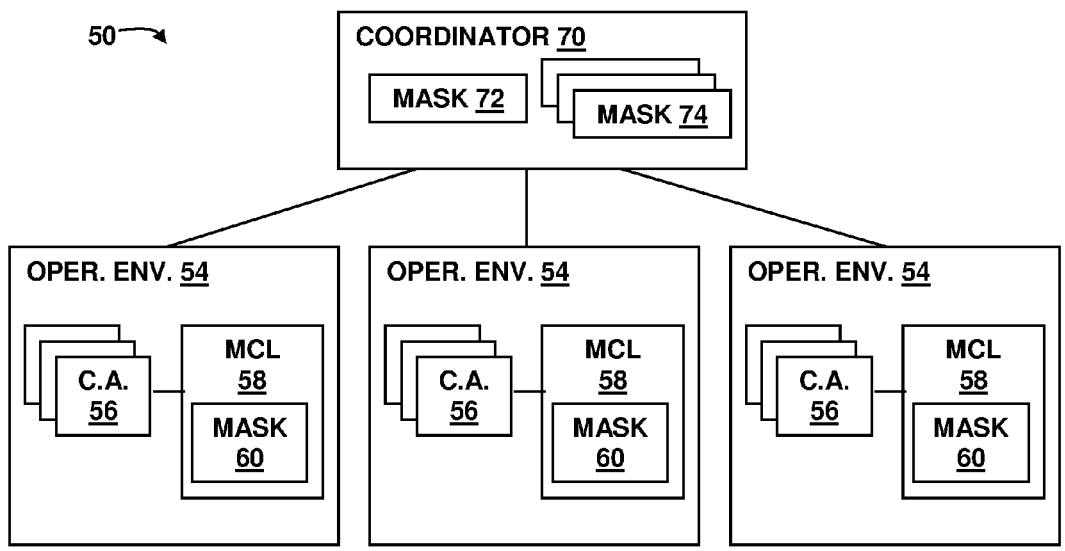
FIG. 3 shows a system in accordance with other embodiments.

FIG. 3 illustrates an embodiment of a system 50 comprising a coordinator 70 (also called a "hypervisor") that spawns and manages one or more operating environments 54. The computing entity 25 of FIG. 1 may perform the functions of the coordinator 70. In some embodiments, each operating environment 54 comprises a "virtual machine." In other embodiments, each operating environment 54 comprises a process. The coordinator 70 spawns an operating environment 54 by, for example, allocating resources for use by the spawned operating environment. Examples of such resources comprise memory, processors, etc. In the embodiment of FIG. 3, each operating environment 54 comprises one or more cache agents 56 coupled together and coupled to mask control logic (MCL) 58.

The coordinator 70 programs a separate mask 74 for use by each operating environment 54 (e.g., one mask 74 per operating environment). Each mask 74 may be the same as or different from the other masks 74. As such, each mask 74 is programmed specifically for the operation of a given operating environment 54. Each such mask 74 for a given operating environment 54 specifies which of that operating environment's cache agents 56 can be sent snoop requests associated with a particular memory address. Thus, if one cache agent 56 within a given operating environment 54 is to transmit snoop requests to other cache agents within that same operating environment, the originating cache agent's mask control logic 68 causes the snoop request to be transmitted to one or more other cache agents in accordance with the mask.

In some embodiments, a copy of the mask 74 for a given operating environment 54 is provided by the coordinator 70 to that particular operating environment and stored in mask memory 60 in that operating environment's mask control 58. The coordinator 70 may provide a copy of the mask upon spawning the operating environment 54 or at a later time as desired by the coordinator or the operating environment.

In some embodiments, the coordinator 70 may benefit from access to all cache agents 56 in the system 50 across all operating environments. Thus, the coordinator 70 may program its own mask 72 for use exclusively by the coordinator. In at least one embodiment, mask 72 species that all cache agents 56 in all operating environments 54 can receive snoop requests associated with any memory address. In other embodiments, the coordinator's mask 72 permits at least the same cache agents 54 permitted to receive snoop requests in accordance with any of masks 74 to receive snoop requests, and further may enable additional or all cache agents to receive snoop requests. The masks 72, 74 may be implemented as explained above regarding FIG. 2.

Figure 4:
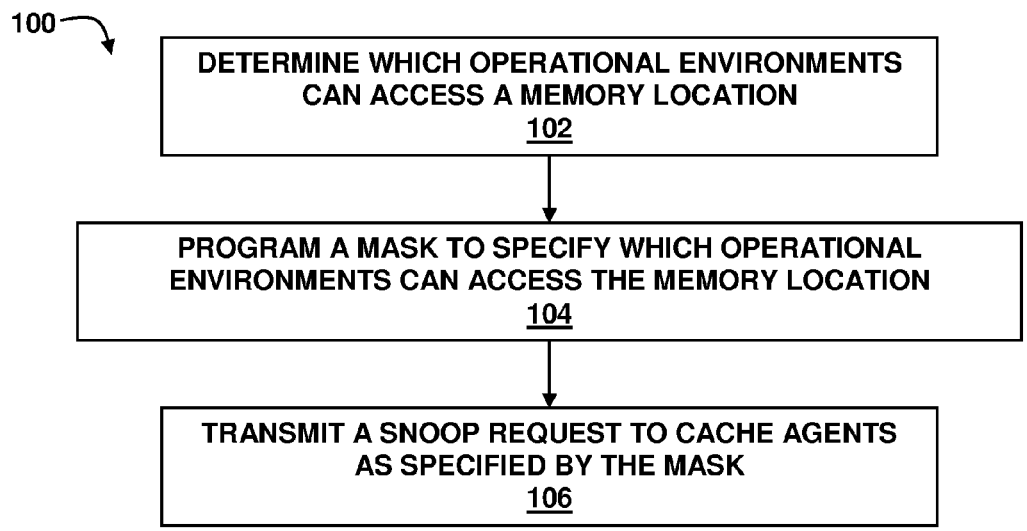
FIG. 4 shows a method in accordance with various embodiments.

FIG. 4 illustrates a method embodiment 100. As shown, method 100 comprises determining (102) which operational environments 54 can access a memory location. Because the coordinator 70 spawns the various operating environments 54, the coordinator knows which operating environments can access certain memory locations, and which cannot. At 104, method 100 comprises programming a mask to specify which operational environment(s) 54 can access each of possibly multiple memory locations. At 106, the method 100 further comprises transmitting a snoop request to cache agents 56 as specified by the mask. If desired, a different mask can be programmed by use of logic such as coordinator 70 as noted above.

Figure 5:
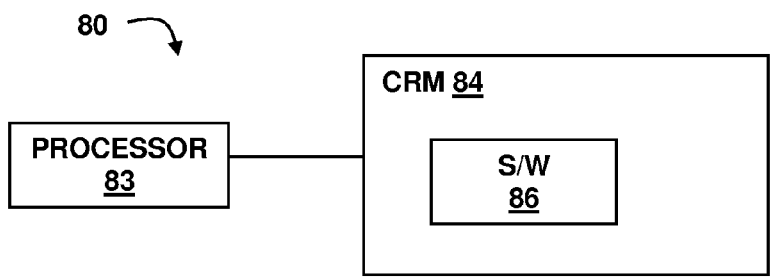
FIG. 5 illustrates an embodiment comprising a computer-readable medium in accordance with various embodiments.

FIG. 5 illustrates an embodiment of a system 80 that is usable to implement any of the cache agents 12, 20, 22, 56, computing entity 25, and coordinator 70. As shown, system 80 comprises a processor 83 coupled to a computer-readable medium (CRM) 84. Software, stored on the computer-readable medium 84 is accessed and executed by processor 83 to perform one or more or all of the functions described herein attributable to any of the cache agents 12, 20, 22, 56, computing entity 25, and coordinator 70. In various embodiments, the computer-readable medium 84 comprises volatile memory (e.g., random access memory), non-volatile storage (e.g., hard disk drive, Flash memory, read-only memory, compact disk read-only memory (CD ROM), etc.), or combinations thereof.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of cache agents;
   a computing entity coupled to said cache agents, wherein said computing entity spawns multiple operating environments using said cache agents and said computing entity programs multiple programmable masks, one programmable mask for each operating environment, and said computing entity provides a copy of each programmable mask to its respective operating environment;
   wherein each programmable mask for a given operating environment is associated with at least one memory address and is indicative of those cache agents in that operating environment that can receive a snoop request associated with a memory address;
   wherein, based on each such programmable mask, said computing entity transmits snoop requests, associated with said memory address, to only those cache agents identified by said programmable mask as cache agents that can receive a snoop request associated with the memory address; and wherein the computing entity programs a computing entity mask that is separate from said programmable masks, is used exclusively by said computing entity, and causes said computing entity to transmit snoop requests to all of said plurality of cache agents without regard to any of the programmable masks.

2. The system of claim 1 wherein, based on each programmable mask, said computing entity avoids transmitting said snoop request to at least one cache agent.

3. The system of claim 1 wherein each operating environment comprises a virtual machine.

4. The system of claim 1 wherein the plurality of cache agents are organized to execute multiple processes, and a separate programmable mask is provided for each such process.

5. The system of claim 1 wherein at least one programmable mask is different from at least one other programmable mask.

6. The system of claim 1 wherein each programmable mask and computing entity mask comprises a plurality of bits, at least one bit is associated with each cache agent.

7. The system of claim 6 wherein only those bits of a predefined logic state indicate that the cache agents associate with such bits can be transmitted a snoop request.

8. The system of claim 6 wherein said each programmable mask and computing entity mask comprises a plurality of sets of bits, each set associated with a different memory address, and wherein, for each set of bits, at least one bit is associated with each cache agent.

9. A method, comprising:
   determining which of a plurality of operational environments can access a memory location, each operational environment comprising at least one cache agent;
   programming a first mask by a coordinator to specify which operational environments can access said memory location;
   providing a copy of said first mask to at least one operational environment;
   transmitting a snoop request to cache agents as specified by said first mask; and
   programming a second mask for use exclusively by the coordinator, said second mask causing said coordinator to transmit snoop requests to cache agents not otherwise permitted by said first mask.

10. The method of claim 9 further comprising determining, based on said first mask, which cache agents are to receive a snoop request associated with said memory location.

11. The method of claim 9 wherein said operational environments comprise virtual machines and said method further comprises programming masks for each of said virtual machines.

12. The method of claim 9 wherein said operational environments comprise executable processes and said method further comprises programming masks for each of said executable processes.

13. A computer-readable medium (CRM) comprising software that, when executed by a processor, causes the processor to:
   determine which of a plurality of operational environments can access a memory location, each operational environment comprising at least one cache agent;
   program multiple masks, one mask for each operational environment, and each mask to indicate, for at least one memory address, those cache agents that can receive a snoop request associated with a memory address; and
   provide said masks to the cache agents that are to transmit snoop requests for said memory address;
   wherein, based on a mask provided to a given cache agent, said mask causes the given cache agent to transmit snoop requests, associated with said memory address, to only those other cache agents identified by said mask as cache agents that can receive a snoop request associated with the memory address; and
   program a second mask for use exclusively by a coordinator, said second mask causing said coordinator to transmit snoop requests to cache agents not otherwise permitted by said multiple masks.

14. The CRM of claim 13 wherein said mask comprises a plurality of bits, a bit associated with each cache agent, and wherein software causes the processor to set a bit to indicate whether the associated cache agent is to receive said snoop request.

* * * * *